United States Patent
Aronson et al.

(10) Patent No.: US 6,839,062 B2
(45) Date of Patent: Jan. 4, 2005

(54) USAGE SEMANTICS

(75) Inventors: David F. Aronson, Woodinville, WA (US); Amar Patel, Redmond, WA (US); Anantha R. Kancheria, Redmond, WA (US); Anuj B. Gosalia, Redmond, WA (US); Craig Peeper, Bellevue, WA (US); Daniel K. Baker, Bellevue, WA (US); Iouri Tarassov, Bellevue, WA (US); Loren McQuade, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/373,340

(22) Filed: Feb. 24, 2003

(65) Prior Publication Data

US 2004/0164987 A1 Aug. 26, 2004

(51) Int. Cl.[7] .............................................. G06T 15/00
(52) U.S. Cl. ...................... 345/522; 717/140; 717/143; 707/2; 707/101
(58) Field of Search .......................... 345/522; 717/100, 717/104, 108, 140, 143; 707/2, 101, 104.1; 382/173, 176

(56) References Cited

U.S. PATENT DOCUMENTS

| | | | | |
|---|---|---|---|---|
| 5,291,602 A | * | 3/1994 | Barker et al. ................ | 715/524 |
| 2002/0123881 A1 | * | 9/2002 | Schmid et al. ................. | 704/4 |
| 2004/0001218 A1 | * | 1/2004 | Christiansen .............. | 358/1.15 |
| 2004/0003370 A1 | * | 1/2004 | Schenk et al. .............. | 717/100 |

OTHER PUBLICATIONS

Humphreys, G. et al., "Chromium: A Stream–Processing Framework for Interactive Rendering on Clusters", *ACM Transactions on Graphics (TOG)*, Proceedings of the 29th*Annual Conference on Computer Graphics and Interactive Techniques*, Jul. 2002, 21(3), 693–699.

Lalonde, P. et al., "Shader–Driven Compilation of Rendering Assets", *ACM Transactions on Graphics (TOG)*, Proceedings of the 29th*Annual Conference on Computer Graphics and Interactive Techniques*, Jul. 2002, 21(3), 713–720.

Lindholm, E. et al.,"A User–Programmable Vertex Engine", ACM SIGGRAPH 2001, *Proceedings of the 28[th]Annual Conference on Computer Graphics and Interactive Techniques*, Aug. 2001, 149–153.

(List continued on next page.)

*Primary Examiner*—Matthew C. Bella
*Assistant Examiner*—Mackly Monestime
(74) *Attorney, Agent, or Firm*—Woodcock Washburn LLP

(57) ABSTRACT

Usage semantics allow for shaders to be authored independently of the actual vertex data and accordingly enables their reuse. Usage semantics define a feature that binds data between distinct components to allow them to work together. In various embodiments, the components include high level language variables that are bound by an application or by vertex data streams, high level language fragments to enable several fragments to be developed separately and compiled at a later time together to form a single shader, assembly language variables that get bound to vertex data streams, and parameters between vertex and pixel shaders. This allows developers to be able to program the shaders in the assembly and high level language with variables that refer to names rather than registers. By allowing this decoupling of registers from the language, developers can work on the language separately from the vertex data and modify and enhance high level language shaders without having to manually manipulate the registers. This also allows the same shaders to work on different sets of mesh data, allowing the shaders to be reused. Generally, semantics can be used as a data binding protocol between distinct areas of the programmable pipeline to allow for a more flexible workflow.

26 Claims, 5 Drawing Sheets

OTHER PUBLICATIONS

McCool, M.D. et al., "Shader Metaprogramming", Eurographics Association, *Proceedings of the Conference on Graphic Hardware 2002*, Sep. 2002, 57–68.

Peercy, M.S. et al., "Interactive Multi–Pass Programmable Shading", SIGGRAPH 2000, *Proceedings of the 27th Annual Conference on Computer Graphics and Interactive Techniques*, Jul. 2000, 425–432.

Proudfoot, K. et al., "A Real–Time Procedural Shading System for Programmable Graphics Hardware", ACM SIGGRAPH 2001, *Proceedings of the 28th Annual Conference on Computer Graphics and Interactive Techniques*, Aug. 2001, 159–170.

* cited by examiner

USAGE SEMANTICS

FIELD OF THE INVENTION

This invention relates in general to the field of computer graphics. More particularly, this invention relates to shaders.

BACKGROUND OF THE INVENTION

The addition of programmable vertex shaders and pixel shaders makes visual quality in real-time graphics take a leap towards cinematic realism. Thanks to the programmable graphics processors on newer graphics cards, developers can add personalized combinations of graphics operations by using these shaders, creating their own effects to their games and other applications. A shader is a piece of code written in a shading language that is designed to be used in either a programmable vertex pipeline or a programmable pixel pipeline within a programmable graphics processor.

Vertex shaders play an important role in allowing developers to create realistic environments and characters that were once beyond the scope of available consumer technology. A vertex typically represents a corner of a polygon where edges meet. Thus, each triangle has three vertices. Likewise, objects in a 3D scene are typically created using triangles. Vertex shaders allow developers to designate the values of the vertex data, so that a vertex emerges with a different color, different textures, or a different position in space. More particularly, a vertex shader is a graphics processing function which manipulates vertex data values typically in 3D space through mathematical operations on an object. These variations range anywhere from differences in color, texture coordinates, orientations in space, fog (how dense it may appear at a certain elevation), and point size. When a vertex shader is enabled, it replaces the fixed-function pipeline for vertices. The shader does not operate on a primitive like a triangle, but on a single vertex. A vertex shader cannot create or destroy vertices, it can only manipulate the vertices. For every vertex to be processed, the shader program executes.

In order for a vertex shader to execute, it needs to know what its inputs are. The inputs are vertices, but there is no fixed definition of what a "vertex" looks like. Typically the input to a vertex shader is a vertex containing a 3D position (X, Y, Z), sometimes having an associated color (r, g, b, a) or texture coordinate (u, v), or other types of data. Furthermore, the data type for each of these elements in the input to a vertex shader could be different (i.e., a single float or 4 floats or 4 unsigned bytes, etc.).

While the data layout and composition of the inputs to a vertex shader need to be flexible to accommodate the author/programmer's needs, vertex shader hardware can only read the inputs in a fixed manner. There are a designated set of input registers that are expected to be filled with the incoming vertex data in some fashion so that the program code in the vertex shader can read the input registers, perform whatever algorithms the vertex shader is programmed to do, and emit an output vertex to output registers. A problem is how to describe to the graphics hardware where to fetch vertex data from, how to interpret the data, and where to arrange it in vertex shader input registers so that the vertex shader may execute.

A pixel shader is a small program which processes pixels and executes on the graphics processor. Put another way, a pixel shader is a graphics function that calculates effects on a per-pixel basis. With pixel shaders, developers can render, light, shade, and color in excess of 2 million pixels per frame all the while keeping a steady 60 frames per second. Programmable pixel shaders take this further by allowing developers to create their own per-pixel effects. In turn, this allows developers control for determining the lighting, shading, and color of each individual pixel, allowing them to create a myriad of unique surface effects. When a pixel shader has been created, a fragment processing function has been created which manipulates fragment data. The 3D scene in OpenGL (a 3D graphics language), for example, is projected onto the XY-plane where the points are called fragments. The fragments contain information such as position and texture coordinates. Several fragments can be added together when displayed to a pixel on the screen.

Microsoft® DirectX® is a suite of multimedia APIs built into Microsoft Windows® operating systems. It provides a standard platform that enables software developers to access specialized hardware features without having to write hardware-specific code. Currently, in high level shading languages for a graphics API, such as Microsoft® DirectX® 8, variables referenced in shader code are tied to specific streams of vertex data. However, modifying the shader code, which requires managing the correct register references, may be complicated to a novice user. Microsoft® Direct® 9.0 contains a high-level shader language for developing and debugging shaders in a C-like language. This capability is in addition to the assembly language shader capability that is used to generate vertex shaders, pixel shaders, and effects. Microsoft® Direct3D® 9 introduced a way to decouple the declaration from the vertex stream data to a particular register; however, this is currently not flexible enough either.

Developers program shaders in assembly and high level languages with variables that refer to registers. Thus, the registers are coupled to the language. Therefore, to modify and enhance high level language shaders, a developer must manually manipulate the registers. Moreover, conventional shaders cannot be reused, as they are only capable of operating on a particular set of mesh data.

In view of the foregoing, there is a need for systems and methods that overcome the limitations and drawbacks of the prior art.

SUMMARY OF THE INVENTION

The present invention is directed to usage semantics which allow for shaders to be authored independently of the actual vertex data and accordingly enables their reuse. Usage semantics define a feature that binds data between distinct components to allow them to work together. In various embodiments, the components include high level language variables that are bound by an application or by vertex data streams, high level language fragments to enable several fragments to be developed separately and compiled at a later time together to form a single shader, assembly language variables that get bound to vertex data streams, and parameters between vertex and pixel shaders. This allows developers to be able to program the shaders in the assembly and high level language with variables that refer to names rather than registers. By allowing this decoupling of registers from the language, developers can work on the language separately from the vertex data and modify and enhance high level language shaders without having to manually manipulate the registers. This also allows the same shaders to work on different sets of mesh data, allowing the shaders to be reused. Generally, semantics can be used as a data binding protocol between distinct areas of the programmable pipeline to allow for a more flexible workflow.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to attaching a semantic to the components in a buffer to provide linking. A semantic is a connection used to provide meaning to outputs of an application such as a shader. For example, a vertex shader and a pixel shader can be linked up by matching the semantics, as described herein.

Exemplary Computing Environment

Figure 1:
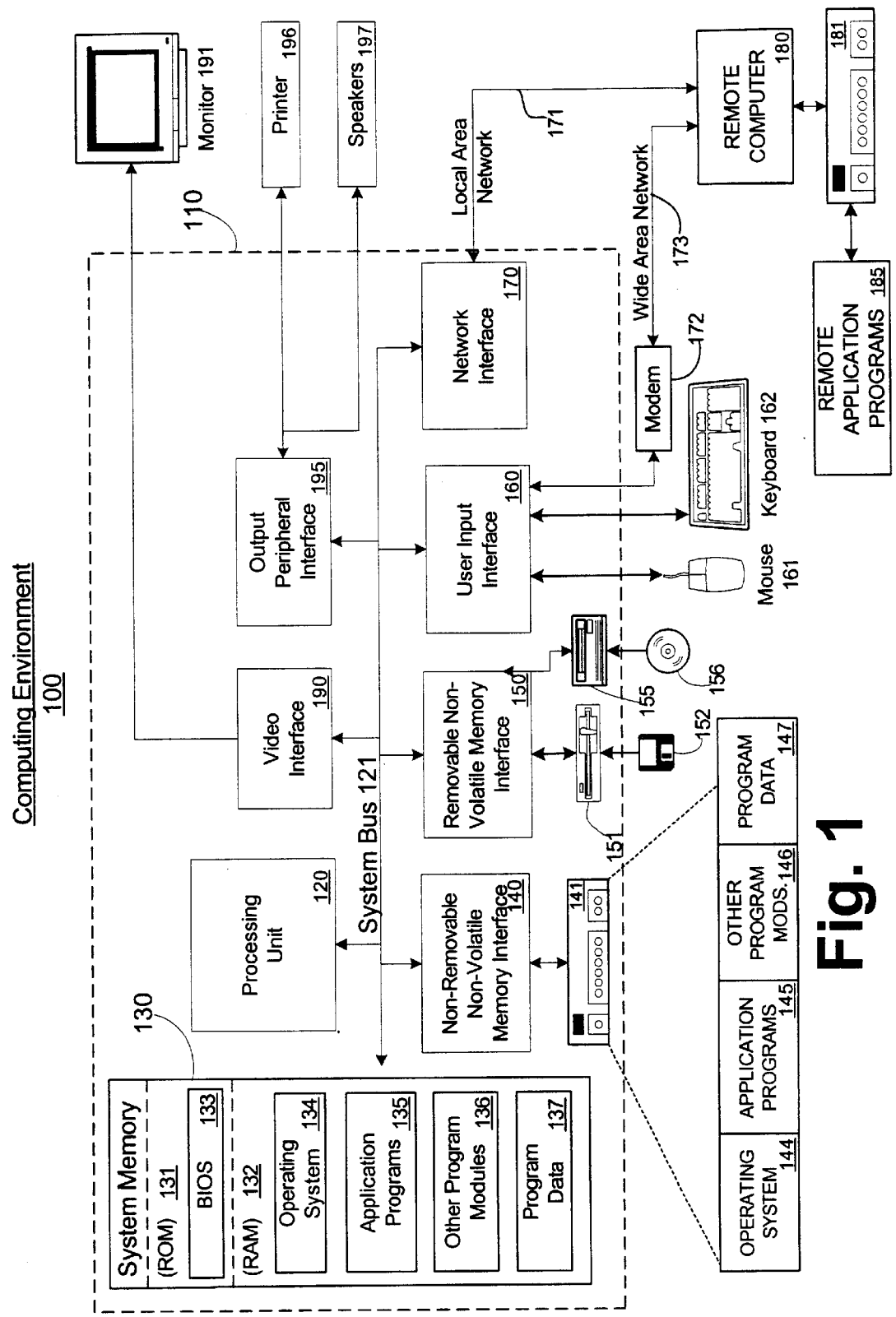
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media.

By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

Figure 2:
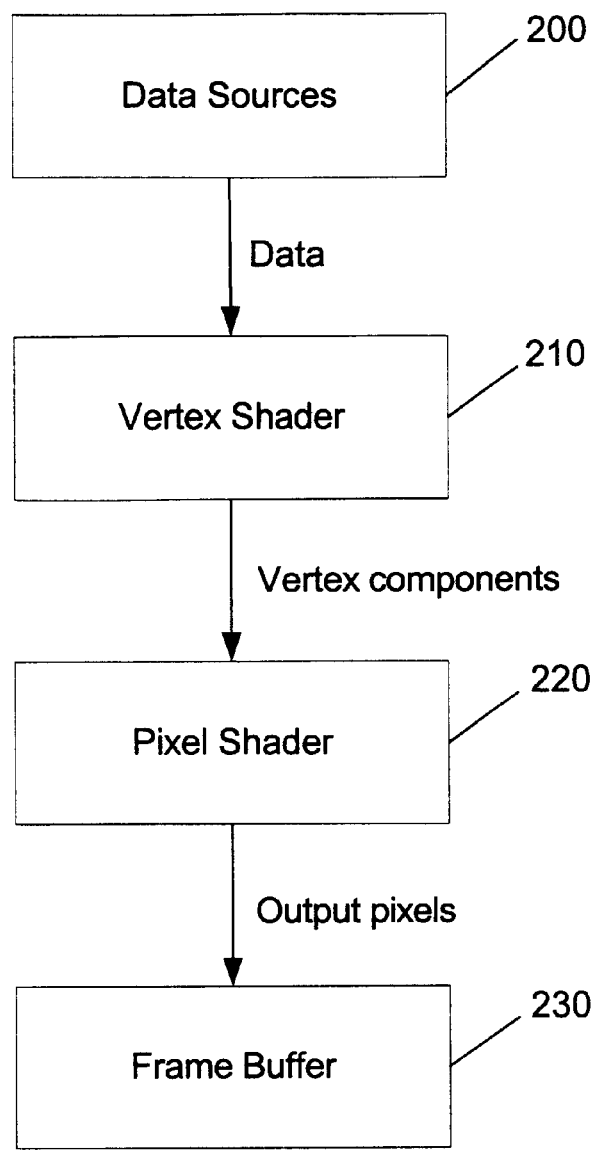
FIG. 2 shows a high level block diagram of an exemplary processing pipeline that is useful in describing the present invention.

FIG. 2 shows a high level block diagram of an exemplary processing pipeline that is useful in describing the present invention. In this exemplary pipeline, data sources such as a vertex buffer 200 provide data to a vertex shader 210 where vertex operations are performed. The output (vertex components) of the vertex shader 210 is provided to a pixel shader 220 where pixel operations are performed. The output of the pixel shader 220 is provided to a frame buffer 230 for storage and subsequent rendering or other processing. It is noted that the output of the vertex shader 210 is the input of pixel shader 220. Semantics in accordance with the present invention can be used to provide linking between the vertex data and the vertex shader, for example, and also to provide linking between the vertex shader and the pixel shader, for example.

Figure 3:
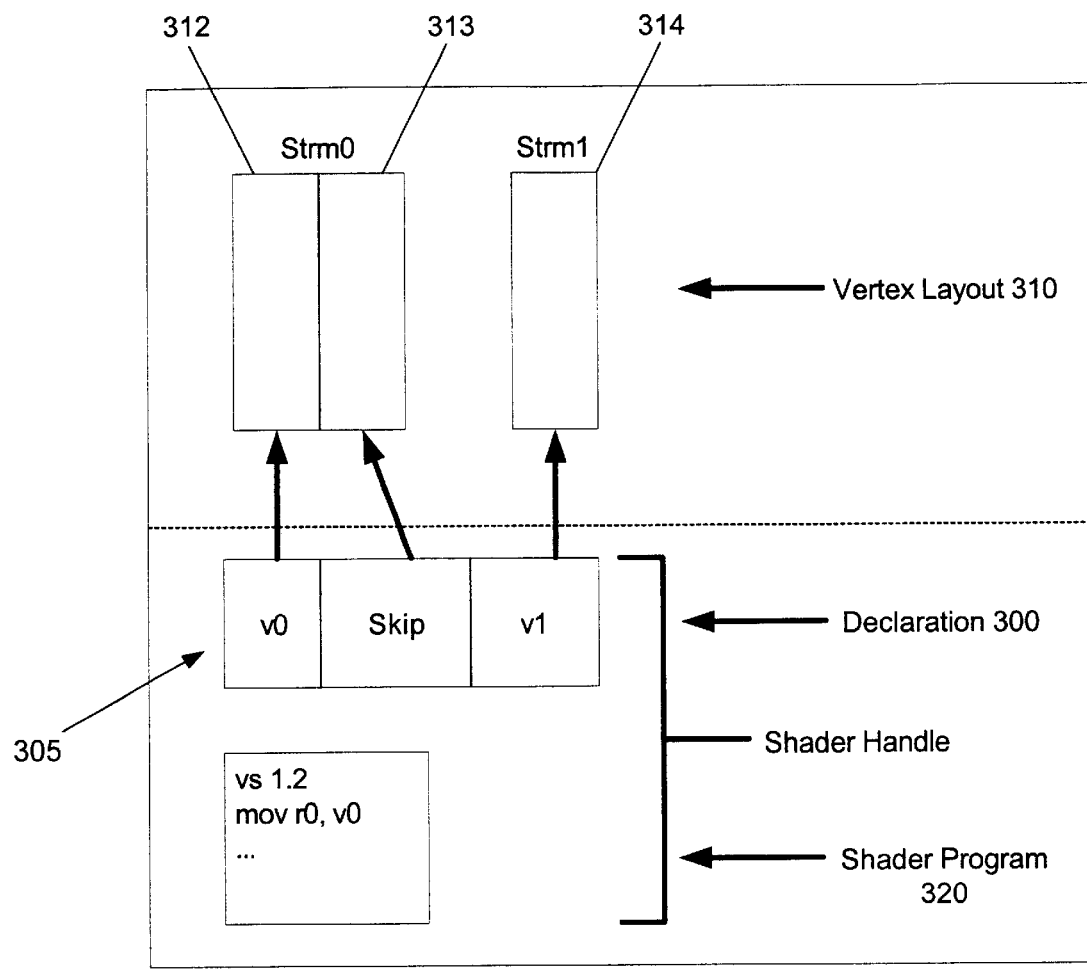
FIG. 3 shows a conventional vertex declaration with a layout and shader code or programming.

As described above, a vertex shader takes a stream of vertices out of a vertex buffer, does operations on them, and sends them to a pixel shader. Conventionally, the stream of vertices would have to be retrieved from the vertex buffer and provided to the vertex shader in a very specific manner, tied to the layout. More particularly, FIG. 3 shows a conventional vertex declaration 300 with layout 310 (a simplified depiction of a potential vertex layout) and shader code or program 320 for mapping or binding vertex data to vertex shader input registers. Streams 312, 313, 314 (e.g., residing in Strm0, Strm0, and Strm1, respectively) of vertex data are transmitted from a vertex buffer. Items 305 (e.g., v0, Skip, v1) referenced in the shader code 320 are tied to specific streams of vertex data, via the declaration 300. For example, as shown in FIG. 3, consider the items v0, v1 and the term "Skip". v0 and Skip are tied to streams 312 and 313, respectively, in the Strm0 vertex data, and v1 is tied to stream 314 in the Strm1 vertex data. v0 and v1 are the names of vertex shader registers. The "Skip" entry is not a register, but an indication that the vertex shader does not need 313. Thus, in the prior art, the shader code 320 takes the input data directly from the layout 310 and is explicitly tied to the data layout coming out of the streams 312, 313, 314 in the vertex buffer. Therefore, modifying the shader code 320 requires managing the correct register references, which is complicated.

Consider a user who wishes to provide vertex data to a vertex shader from two separate sources, or locations in memory. Suppose one of those locations in memory (314) contains the diffuse colors (rgba) of each of the vertices that will be processed by the graphics hardware. Element 314 is labeled "Strm1" as shorthand for "stream 1". The term "stream" refers to the fact that the collection of data (diffuse colors in this case) is intended to be read into the vertex shader sequentially, so that for every vertex, one diffuse color is fetched from stream 1. Suppose streams 312 and 313 represent a 3D position (X, Y, Z) and a normal vector (also X, Y, Z). In contrast to stream 1, which contained only color, stream 0 contains both positions and normals for each vertex, interleaved. In other words, the position and normal for a given vertex are adjacent to each other in memory, and the position and normal for the next vertex follow appear next to that.

The data describing a single vertex is composed by reading data from each input stream. In this case, a single vertex is described by fetching a position and normal from stream 0, and a diffuse color from stream 1.

In the prior art, a vertex shader comprises two parts, and the combination of the two parts identifies a vertex shader (the pair is identified by a "Shader Handle", which is a number that a program can use to refer to it). One part is the vertex shader program 320 itself, and the other part (the declaration 300) is the description of how to map the input data into input registers. The vertex shader hardware has input registers designated v0, v1, v2, v3, etc. Each register is typically capable of holding up to four floating point values (for example, a color containing red, green, blue, and alpha can fit into a register).

In this example, the declaration 300 identifies that: input register v0 is to fetch data from 312 in stream 0; 313 in stream 0 is to be skipped (meaning this vertex shader does not need that data); and v1 is to fetch data from stream 1. In other words, this vertex shader wishes to see a position in v0 and a color in v1. It does not need to use a normal (which is in stream 313). So for each of the vertices to be processed, v0 and v1 are initialized with a new position and color respectively, read sequentially from the input streams, and the vertex shader executes.

Note that the names "position", "color", and "normal" have been used to give some meaning to the data for this description, and that the prior art does not actually have any knowledge of what a "position", "color", or "normal" is. The user knows what data she placed in the streams and how it was laid out, and has the burden of remembering all of this when constructing the vertex declaration 300 and writing the shader program 320.

Furthermore, if the user wishes to reuse the same vertex shader program 320 except with a different data layout for the streams, then a new vertex declaration 300 would have to be constructed, resulting in the user having to construct a separate pairing of vertex shader and vertex declaration (a new "Shader Handle") for use with the different stream layout. If the user wishes to use different vertex shader programs with a particular vertex data layout, then each of the vertex shaders will have its own vertex declaration.

Figure 4:
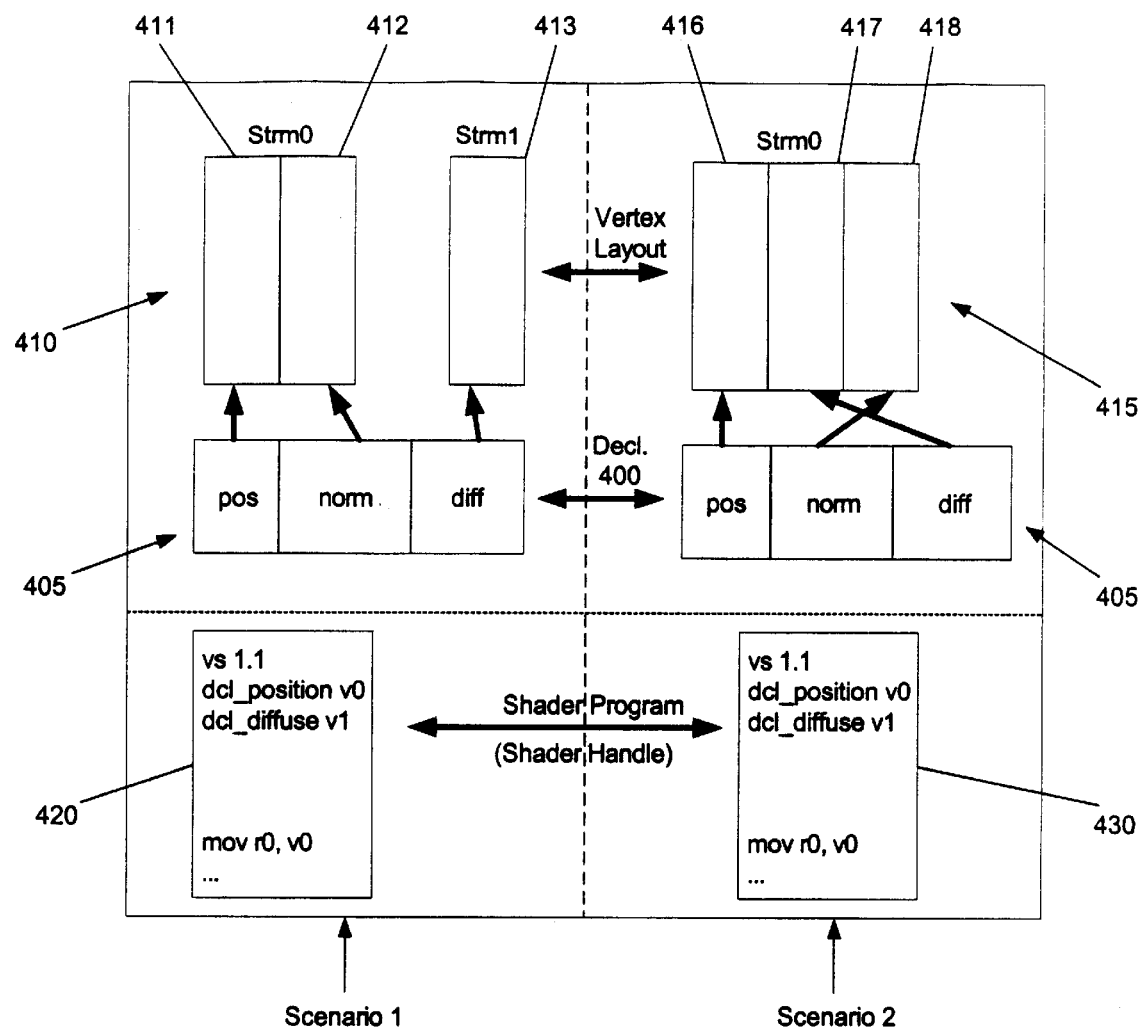
FIG. 4 shows an exemplary vertex declaration with layouts and shader programs in accordance with the present invention.

FIG. 4 shows an exemplary vertex declaration 400 with layouts and shader programs in accordance with the present invention, and outlines an exemplary technique used to describe the binding between vertex data and vertex shader inputs. Moreover, FIG. 4 provides a vertex declaration that is not tied to the vertex program. Two exemplary scenarios are shown. According to the invention, the declarations 400 and references to the declarations in the shader programs 420, 430 refer to semantics rather than register names, as in the prior art. The present invention provides an intermediate level (the declarations) that allows a shader program to define which stream of vertex data goes where in the shader. This increases the flexibility. For example, in Scenario 1, there are data streams 411, 412 in Strm0 and data stream 413 in Strm1. The semantics 405 shown are pos, norm, and diff which reside in the intermediate level. The shader program 420 defines which semantic is to be connected to which data stream in the vertex layout 410. As shown, pos is tied to stream 411, norm is tied to stream 412, and diff is tied to stream 413. Thus, semantics 405 show a declaration that identifies the various parts of data streams with names that describe how the data will be used. For example, stream 411 is a position, stream 412 is a normal, and stream 413 is a diffuse color.

Now, the vertex shader assigns a semantic to each input v# register that it expects to use. The graphics hardware can match up the semantics in the vertex shader program 420 with the semantics 405 in the separate vertex declaration, and that is enough information to initialize the inputs of the vertex shader program 420 and execute it. The statement "dc1_position v0" in shader program 420 indicates that the vertex shader is declaring that the register v0 should be initialized with a position. Similarly, in this example, v1 should be initialized with a diffuse color. These semantics are present in the vertex declaration 405. Note that the vertex shader does not declare a normal, so the normal in the exemplary program 420 is automatically unused.

However, if the vertex layout changes to the vertex layout 415 in Scenario 2, for example, the semantics 405 do not change; instead, the data streams that they are tied to can be changed (e.g., pos ties to data stream 416, norm ties to data stream 418, and diff ties to data stream 417, all in Strm0). The shader program 430 does not need to know about these changes and instead still calls the semantics through declaration statements, as in the shader program 420 in Scenario 1. Thus, data gets taken out of the vertex buffer and then the shader uses the declaration to take what it wants. The appropriate vertex stream data is connected to the vertex shader register. This allows for semantics to be used as a data binding protocol between distinct areas of the programmable pipeline to allow for a more flexible workflow, and to adapt a shader to different layouts. Unlike in the prior art, the shader designer or creator does not need to know how the stream works.

Thus, in Scenario 2, the same vertex shader program (shown as element 430 in Scenario 2 and element 420 in Scenario 1) can be used with a different layout of vertex data. Here, all the data is in one stream (Strm0). Data stream 416 contains a position, data stream 417 contains a diffuse color, and data stream 418 contains a normal. The description of this layout is encapsulated in the new vertex declaration 405, which identifies the semantics of the data available, and where they are located.

Because this description of the data layout is now separated from the vertex shader program, the user does not need to remember what the layout is when authoring the vertex shader. The user can identify what inputs are required by using semantics as a naming convention. As such, a single vertex shader can be used with any number of vertex data layouts. In other words, the vertex data layout being used with a given vertex shader can be changed (for any reason) without having to rewrite the vertex shader program.

It is noted that the vertex streams are a producer of data, and they advertise what they have by semantic. The vertex shader is a consumer of data, and it identifies what it needs by semantic. The graphics system takes responsibility for matching up what is needed with what is advertised, via the semantic naming convention.

Vertex shader input semantics are annotations that identify data usage for the vertex shader input data. Exemplary input semantics include:

| | |
|---|---|
| POSITION[n] | position |
| BLENDWEIGHT[n] | blend weights |
| BLENDINDICES[n] | blend indices |
| NORMAL[n] | normal vector |
| PSIZE[n] | point size |
| DIFFUSE[n] | diffuse color |
| SPECULAR[n] | specular color |
| TEXCOORD[n] | texture coordinates |
| TANGENT[n] | tangent |
| BINORMAL[n] | binormal |
| TESSFACTOR[n] | tessellation factor | where n is an optional integer. For example, PSIZE0, DIFFUSE1, etc.

Output semantics are annotations that identify data usage for the vertex shader output data, and include for example:

| | |
|---|---|
| POSITION | Position |
| PSIZE | Point size |
| FOG | Vertex fog |
| COLOR[n] | Color (example: COLOR0) |
| TEXCOORD[n] | Texture coordinates (example: TEXCOORD0) | where n is an optional integer. As an example, texcoord0.

Input semantics for a pixel shader are annotations that identify data usage for the pixel shader input data, and include, for example:

| | |
|---|---|
| COLOR[n] | Diffuse or specular color (example: COLOR0 or COLOR1) |
| TEXCOORD[n] | Texture coordinates (example: TEXCOORD0) | where n is an optional integer. As an example, TEXCOORD0, TEXCOORD1, etc.

Output semantics for a pixel shader are annotations that identify data usage for the pixel shader output data.

| | |
|---|---|
| COLOR[n] | Color (example: COLOR0) |
| TEXCOORD[n] | Texture coordinates (example: TEXCOORD0) | where n is an optional integer. As an example, texcoord0.

Semantics other than those set forth above are contemplated and can be used in a variety of components (FIG. 5), not just vertex shaders and pixel shaders.

The semantics are preferably defined by the compiler backends so any semantic that is defined in a backend will be processed by the compiler and have the data properly bound. If the semantic is not defined, then the backend preferably will ignore it, warn the user, and/or stop the compile.

The structure for an exemplary semantic (for vertex data, as an example) is given as:

```
struct D3D_VERTEX_ELEMENT_9
{
    Stream;      // id from setstream( )
    Offset;      // offset# verts into str
    Type;        // float vs byte, etc.
    Method;      // tessellator op
    Usage;       // default semantic(pos, etc)
    UsageIndex   // e.g. texcoord[#]
}
```

The following exemplary code is directed to a vertex shader that uses and implements a single stream. Data is provided to four registers, with position, normal, and two sets of texture coordinate data.

```
technique Assembly_Level_VertexShader
{
  pass P0
  {
    // Vertex state
    VertexShaderConstant4[0] = <matWorld>;
    VertexShaderConstant4[4] = <matViewProj>;
    VertexShaderConstant1[13] = <vecLightColor>;
    VertexShaderConstant1[16] = <vecLightDir>;
    VertexShader=
    asm_
    {
      vs_1_1
      dcl_position v0
      dcl_normal v3
      dcl_texcoord v7
      dcl_texcoord v8
      m4x4 oPos, v0, c4    // Transform point to projection space.
      m3x3 r0,v3,c0        // Transform normal to world space,
                           // put result into r0.
      dp3 r0,r0,-c16       // Dot product against light, r0 has lighting
                           // constant in x, y, and z components (r,g,b).
      mul r0,r0,c13        // Modulate against diffuse light color.
      mov oD0,r0           // Put into diffuse color output.
    }
  }
};
```

The semantics are declared using dcl statements.

Figure 5:
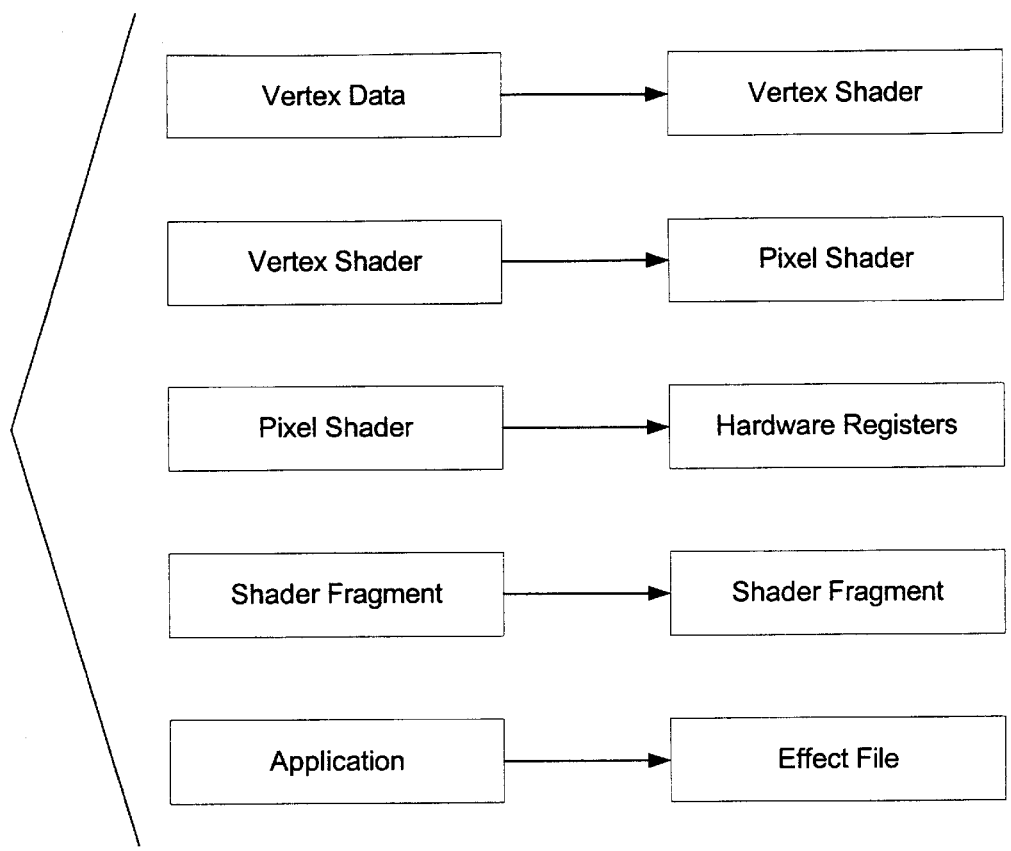
FIG. 5 shows different exemplary objects that semantics are used for linking between in accordance with the present invention.

FIG. 5 shows different objects that semantics are used for linking between. Although described herein with respect to vertex shaders, the present invention can be used to link various types of objects, such as data and shaders, shaders and registers, fragments, and applications and effects. While FIG. 4 depicted one particular exemplary application of binding a producer and a consumer of data via semantics in the graphics pipeline, FIG. 5 shows several other exemplary scenarios where the same mechanism adds value. The left column represents various producers of data, and the right column represents consumers of data. The top row (vertex data->vertex shader) is the exemplary scenario described with respect to FIG. 4. In FIG. 5, each row represents a producer of data that may identify its outputs via semantics, followed by a consumer of data that may identify its inputs by the same convention. The underlying graphics system can be assigned the task of matching up the semantics and making the necessary connections to allow data to flow correctly.

This matching task can be handled by the graphics system, given semantics as a guide, and as a result the burden is removed from the user/authors. Each of the exemplary components in FIG. 5 (as well as others not shown) can each be independently authored without any knowledge of exactly how the other parts were authored, resulting in greater ease of programming, flexibility, and reusability of individually authored components.

In other words, in various embodiments, the components include high level language variables that are bound by an application or by vertex data streams, high level language fragments to enable several fragments to be developed separately and compiled at a later time together to form a single shader, assembly language variables that get bound to vertex data streams, and parameters between vertex and pixel shaders. This allows developers to be able to program the shaders in the assembly and high level language with variables that refer to names rather than registers. By allowing this decoupling of registers from the language, developers can work on the language separately from the vertex data and modify and enhance high level language shaders without having to manually manipulate the registers. This also allows the same shaders to work on different sets of mesh data, allowing the shaders to be reused. Generally, semantics can be used as a data binding protocol between distinct areas of the programmable pipeline to allow for a more flexible workflow.

As mentioned above, while exemplary embodiments of the present invention have been described in connection with various computing devices and graphics systems, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computer graphics system comprising:
   a first component comprising a layout of data streams and at least one declaration of a usage semantic;
   a software program that links the usage semantic to one of the data streams using the declaration; and
   a second component that receives data from the first component, and defines which one or more of the data streams in the first component the usage semantic is to be connected to.

2. The system of claim 1, wherein the usage semantic comprises an identifier and an offset into one of the data streams.

3. The system of claim 1, wherein the usage semantic binds data between the first and second components.

4. The system of claim 3, wherein the usage semantic comprises a data binding protocol.

5. The system of claim 3, wherein the first component comprises a vertex shader and the second component comprises a pixel shader.

6. The system of claim 3, wherein the first component comprises vertex data and the second component comprises a vertex shader.

7. The system of claim 3, wherein the first component comprises a pixel shader and the second component comprises a plurality of hardware registers.

8. The system of claim 3, wherein each of the first component and second component comprises an associated shader fragment.

9. A usage semantic for providing a link between a first component comprising a layout of data streams, and a second component in a computer graphics system, the second component receiving data from the first component and defining which one or more of the data streams in the first component the usage semantic is to be connected to, the usage semantic comprising an identifier and an offset into one of the data streams.

10. The usage semantic of claim 9, wherein the usage semantic binds data between the first and second components.

11. The usage semantic of claim 10, wherein the usage semantic comprises a data binding protocol.

12. A computer-readable medium having stored thereon a usage semantic that provides a link between a first component comprising a layout of data streams, and a second component in a computer graphics system, and comprises an identifier and an offset into one of the data streams, the second component receiving data from the first component and defining which one or more of the data streams in the first component the usage semantic is to be connected to.

13. The computer-readable medium of claim 12, wherein the usage semantic binds data between the first and second components.

14. The computer-readable medium of claim 12, wherein the usage semantic comprises a data binding protocol.

15. A method for providing linking in a computer graphics system, comprising:

provided a layout of data streams and at least one declaration of a usage semantic in a first component;

linking the usage semantic to one of the data streams using the declaration;

defining in a second component which one or more of the data streams in the first component the usage semantic is to be connected to; and providing data to the second component from the first component.

16. The method of claim 15, wherein the usage semantic comprises an identifier and an offset into one of the data streams.

17. The method of claim 15, further comprising binding data between the first component and the second component using the usage semantic.

18. The method of claim 17, wherein the usage semantic comprises a data binding protocol.

19. A computer-readable medium having stored thereon computer-executable instructions for providing linking in a computer graphics system, the method comprising:

providing a layout of data streams and at least one declaration of a usage semantic in a first component;

linking the usage semantic to one of the data streams using the declaration;

defining in a second component which one or more of the data streams in the first component the usage semantic is to be connected to; and providing data to the second component from the first component.

20. The computer-readable medium of claim 19, wherein the usage semantic comprises an identifier and an offset into one of the data streams.

21. The computer-readable medium of claim 19, having further computer-executable instructions for binding data between the first component and the second component using the usage semantic.

22. The computer-readable medium of claim 21, wherein the usage semantic comprises a data binding protocol.

23. A computer graphics system comprising:

means for providing a layout of data streams and at least one declaration of a usage semantic in a first component;

means for linking the usage semantic to one of the data streams using the declaration;

means for defining in a second component which one or more of the data streams in the first component the usage semantic is to be connected to; and means for providing data to the second component from the first component.

24. The system of claim 23, wherein the usage semantic comprises an identifier and an offset into one of the data streams.

25. The system of claim 23, further comprising means for binding data between the first component and the second component using the usage semantic.

26. The system of claim 25, wherein the usage semantic comprises a data binding protocol.

* * * * *